United States Patent [19]
Goss et al.

[11] Patent Number: 5,639,113
[45] Date of Patent: *Jun. 17, 1997

[54] MOUNTING ASSEMBLY FOR AIR BAG

[75] Inventors: David C. Goss, Rockford; Steven P. Donovan, Roscoe; David W. Everdon, Rockford, all of Ill.

[73] Assignee: Textron Inc., Providence, R.I.

[*] Notice: The term of this patent shall not extend beyond the expiration date of Pat. No. 5,630,611.

[21] Appl. No.: 630,378

[22] Filed: Apr. 10, 1996

Related U.S. Application Data

[63] Continuation of Ser. No. 505,670, Jul. 21, 1995.

[51] Int. Cl.$^6$ .............................. B60R 21/16; F16B 21/14
[52] U.S. Cl. ...................... 280/728.2; 411/353; 411/517
[58] Field of Search ................................. 280/728.2, 731; 411/516, 517, 518, 530, 353, 105, 348

[56] References Cited

U.S. PATENT DOCUMENTS

| | | | |
|---|---|---|---|
| 4,785,144 | 11/1988 | Fosnaugh et al. | 280/731 |
| 5,207,544 | 5/1993 | Yamamoto et al. | 411/348 |
| 5,383,682 | 1/1995 | Nagata et al. | 280/731 |

*Primary Examiner*—Paul N. Dickson
*Attorney, Agent, or Firm*—Trexler, Bushnell, Giangiorgi & Blackstong, Ltd.

[57] ABSTRACT

A fastening assembly for an inflatable module includes a support structure arranged for securing the inflatable module to a vehicle component or the like, and a coupling member having a portion projecting from the support structure. A locking member securable to the vehicle component is arranged for reception of the coupling member which has a resilient lock element slidably carried on the projecting portion of the coupling member and arranged for snap fit into a locking position within the locking member to secure fastening of the module to the vehicle component. In one embodiment, a resiliently compressible split-ring is slidably carried within a contoured recess on the coupling pin adjustably projecting from the housing of the inflatable module and a locking bushing mounted for example in the hub portion of a steering wheel is arranged to receive the coupling pin so that the split ring is inserted and locked into a locking cavity within the bushing to secure fastening of the module to the steering wheel hub. In another aspect of the fastening assembly, the locking bushing can be suspended on a mounting bracket to enable a floating realignment with the coupling projection to adjust for initial misalignment in the approach of the coupling projection, as when dimensional tolerances of the parts become cumulative.

9 Claims, 5 Drawing Sheets

5,639,113

MOUNTING ASSEMBLY FOR AIR BAG

CROSS-REFERENCE TO RELATED APPLICATION

This Application is a Continuation of application Ser. No. 08/505,670, filed Jul. 21, 1995, and commonly assigned.

BACKGROUND OF THE INVENTION

This invention relates to fastening assemblies for mounting protective modules containing inflatable restraint bags in passenger vehicles, and more particularly relates to rapid, push-in securement system for the module which permits mounting without need for handling of separate fasteners and tools.

Preassembled, inflatable, "air bag" modules are typically delivered to vehicle manufacturers and then mounted as a unit to a vehicle component such as a steering wheel, dashboard or side door, along the vehicle assembly line. U.S. Pat. No. 5,005,860 describes an air bag mounting arrangement using spring claws to stabilize positioning of the air bag housing prior to bolting the housing onto the steering wheel hub. In the effort to eliminate conventional fastening tools and fasteners for mounting the air bag module, U.S. Pat. No. 5,333,897 describes use of spring-loaded, push-on couplers which have complex fabrication and construction. Improved simplicity in both manufacturing and assembly are achieved by the module fastening system of the present invention, or will become apparent from the following discussion taken in conjunction with the drawings. More specifically, one problem encountered with the prior art systems is the inability to cope with tolerance build up, wherein the various components to be inter-engaged do not align properly. When this occurs, any time that may have been saved using the snap-fit type assembly may be lost in reworking components to attain proper alignment. Another disadvantage with this prior art design is the relative complex nature of the system components and the need for time-consuming and expensive fabrication thereof.

SUMMARY OF THE INVENTION

In accordance with the present invention, a fastening assembly for an inflatable module includes a support structure arranged for securing the inflatable module to a vehicle component or the like, and a coupling member having a portion projecting from the support structure. A locking member securable to the vehicle component is arranged for reception of the coupling member or pin which has a resilient lock element slidably carried on the projecting portion of the coupling member and arranged for snap-fit engagement into a locking position within the locking member to attain fastening of the module to the vehicle component. In one embodiment, a resiliently compressible split-ring is slidably carried within a contoured recess on the coupling pin adjustably projecting from the housing of the inflatable module and a locking bushing mounted for example in the hub portion of a steering wheel is arranged to receive the coupling pin so that the split ring is inserted and locked into a locking cavity within the bushing to secure fastening of the module to the vehicle component such as the steering wheel hub.

In another aspect of the fastening system of the invention, the locking bushing which receives the coupling pin is carried on a movable mounting bracket to enable a floating realignment with the coupling projection to adjust for initial misalignment in the approach of the coupling projection, as when dimensional tolerances of the parts become cumulative.

In other embodiments of the invention, a threaded coupling can be provided by an internally threaded nut which is mounted or carried for movement on a mounting bracket so that the nut can be threaded onto a threaded fastener projecting from the module after the fastener initially engages and guides the realigning displacement of the floating nut.

DETAILED DESCRIPTION OF THE PREFERRED EMBODIMENTS

Figure 1:
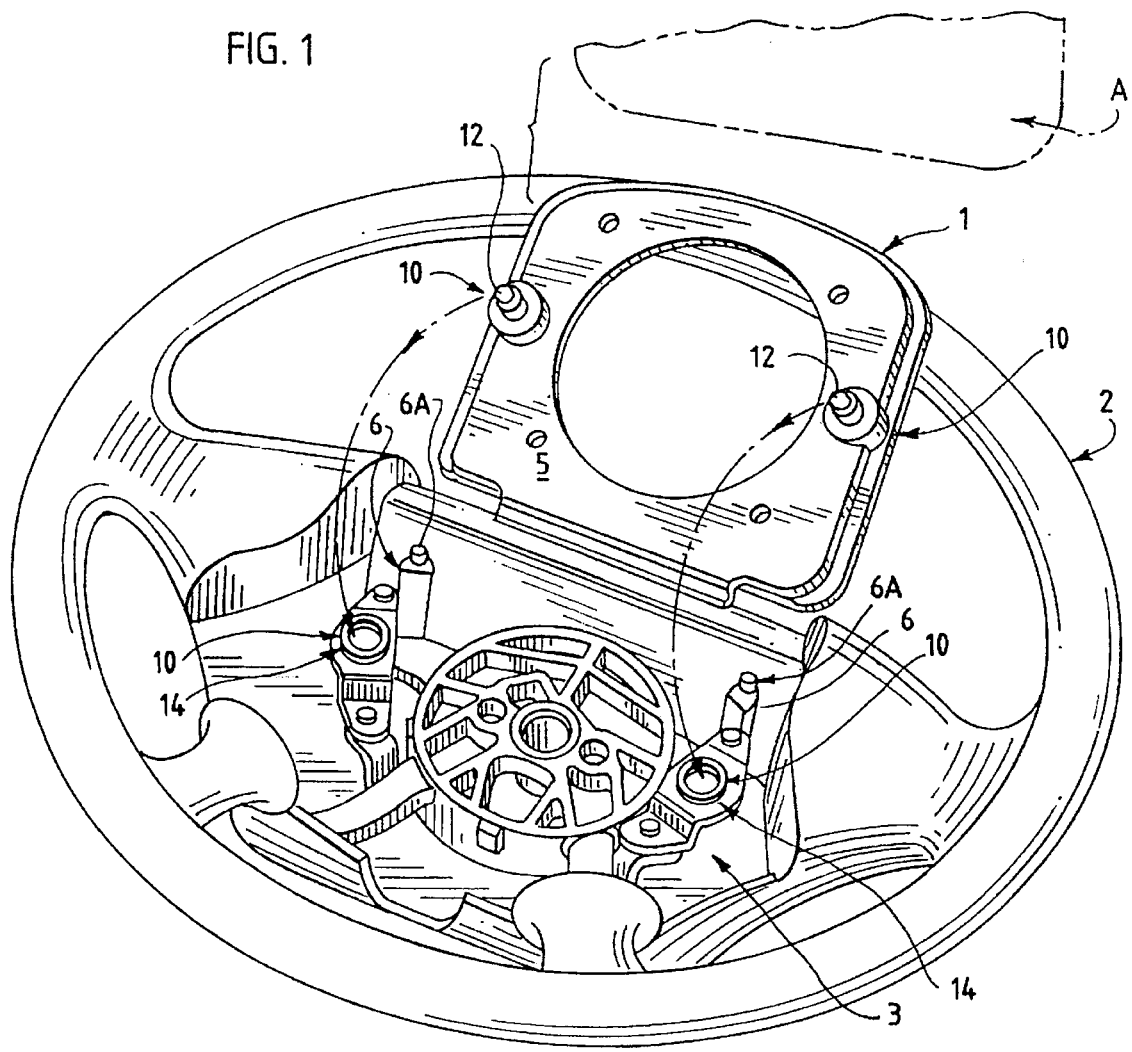
FIG. 1 is a perspective view of a first embodiment of a fastening assembly in accordance with the present invention prior to securement and illustrating an inflatable restraint bag and housing module to be mounted on the hub of a vehicle steering wheel.
Figure 2:
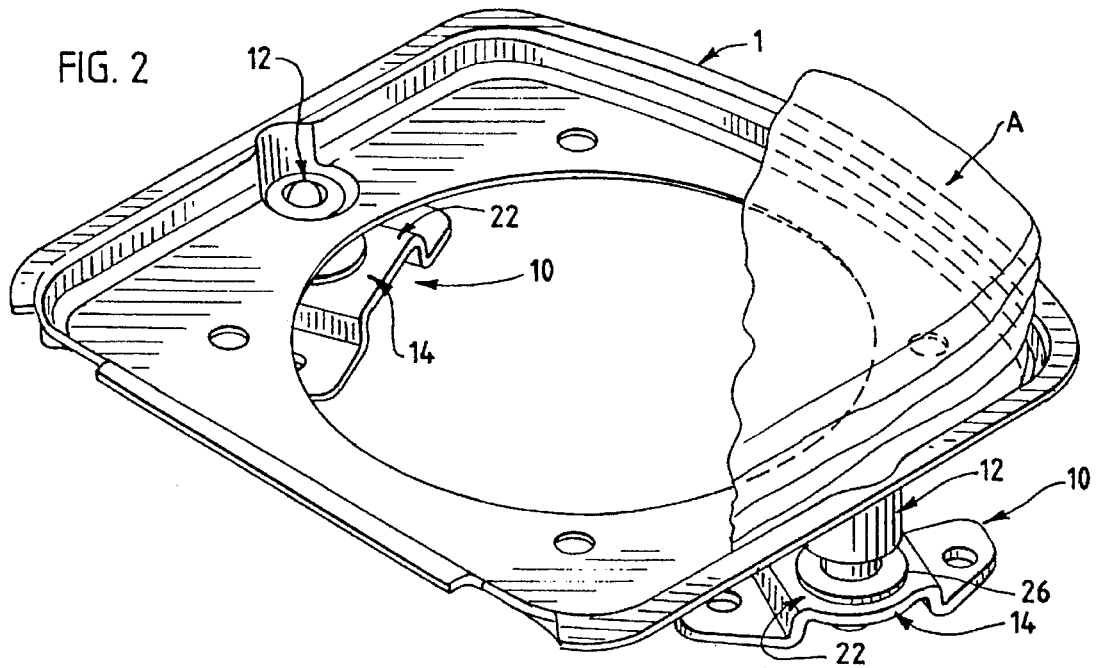
FIG. 2 is a perspective view of the secured fastening assembly shown in FIG. 1, in which the housing is partially fragmentary and the steering wheel hub has been omitted for clarity of the fastening assembly.

Referring initially to FIGS. 1 and 2, an embodiment of the fastening system or assembly 10 in accordance with the present invention is illustrated for securing a modular housing 1 for an inflatable, restraint bag A to a vehicle steering wheel construction 2. The fastening assembly 10 could also be employed for securing the bag module housing 1 to other vehicle components, for example, a dashboard in the case of a passenger air bag or a side door, and therefore the fastening assembly according to the present invention is versatilely employable particularly in any application where a "push-in" securement of the air bag module is desirable to eliminate need for access panels or separate fasteners and tools.

As shown in FIG. 1 which illustrates the fastening assembly or system 10 prior to securement, the fastening assembly includes at least a pair of spaced, coupling pins 12 mounted on the underside of the inflatable module housing 1. The number of pins is optional and it is envisioned that three or four such pins could also be used. The pins 12 are received in respective locking bushings 14 which are mounted in the hub portion 3 of the steering wheel 2. The coupling pins 12 need only be pushed into the locking bushings 14 to securely lock the module in place and simplify the inflatable module mounting operation, particularly along assembly line manufacturing. FIG. 2 illustrates securement of two coupling pins 12 of the mounted housing 1 inserted and locked into the respective bushings 14 as further described hereinafter.

Figure 3:
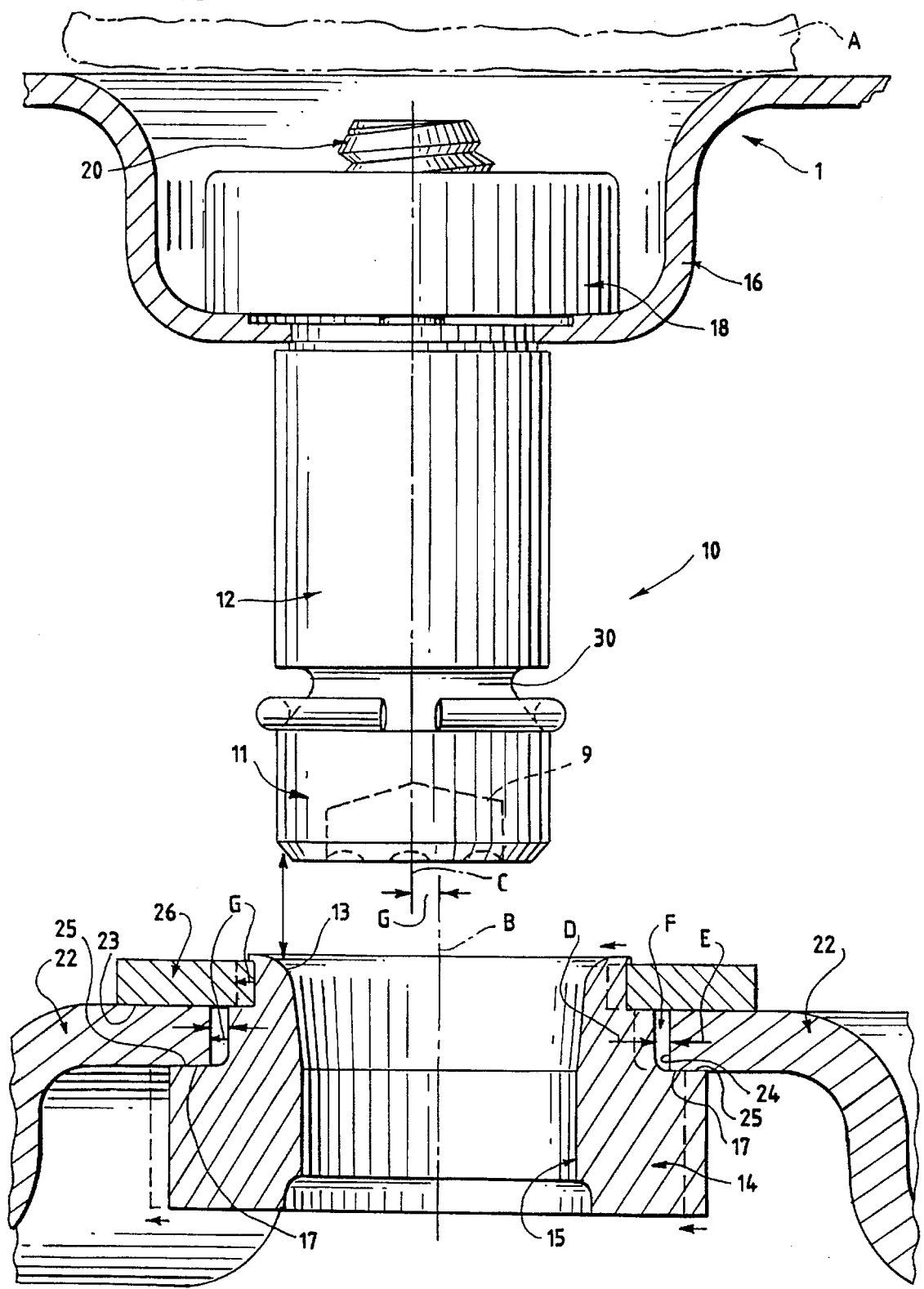
FIG. 3 is an enlarged, sectional view, partially fragmentary, of the fastening assembly shown in FIGS. 1 and 2.
Figure 8:
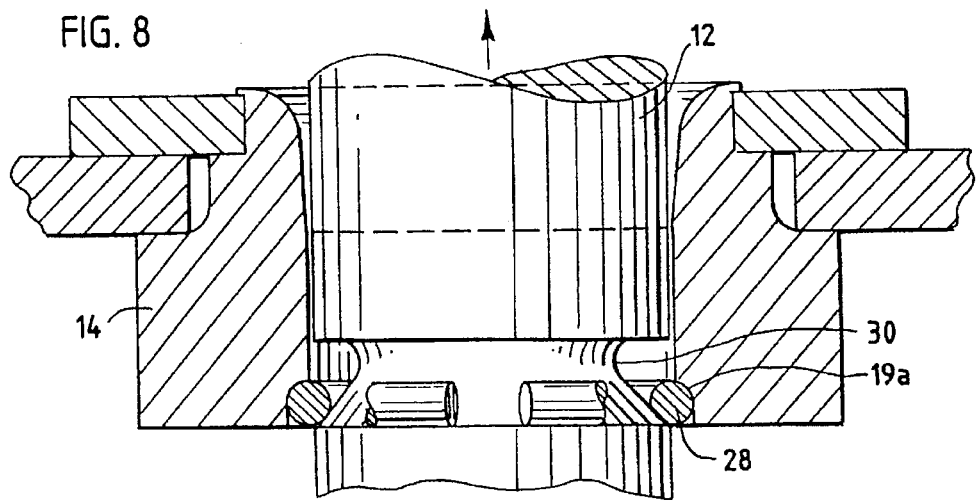

Referring now to FIG. 3, the inflatable module housing 1 has an underside mounting flange 16 formed from the plate-like housing and recessed to which is secured a nut 18 which is internally threaded to receive the threaded upper portion 20 of a respective locking pin 12 which projects from the mounting flange 16. The nut 18 may be staked or otherwise secured to the flange 16, as for example by welding, spot welding or other well known techniques. A tooling recess 9, preferably in a TORX PLUS® configuration, is formed in an end of the pin 12 opposite the threaded end 20, which tooling recess facilitates threading or unthreading the pin portion 20 into or from the fixed nut 18 as well as relative threaded adjustment of the axial pin travel through the nut 18 in order to tighten and remove any play from the locking structure in the fastening assembly as shown in FIG. 8, discussed more fully hereinafter. The tooling recess 9 thus also enables use of a tool to unthread or remove the pin 12 from the nut 18 to allow disassembly of the air bag module. In the particularly illustrated embodiment, the nut 18 is clinched to the mounting flange 16 using a STRUX® nut by the widely employed clinching securement described for example in U.S. Pat. Nos. 3,967, 669 and 4,893,976 which texts are incorporated herein by reference. It should be noted that the components thus described, namely the pin 12 and nut 18 are of relatively conventional configurations which are easily and generally fabricated using standard fastener manufacturing techniques and tooling. Thus, unlike the prior art systems, the present system does not require components that are fabricated using non-conventional or special techniques or equipment.

Referring again to FIGS. 1 and 3, in the illustrated embodiment, each of the locking bushings 14 which receive the pins 12 is supported on a support bracket 22 in a "floating" or self-adjusting manner to enable lateral movement of the bushing 14 perpendicular to its longitudinal axis B of the bore 15. The floating lateral movement of the locking bushing 14 is enabled by providing the mounting bracket 22 with an oversized aperture 24 through which the locking bushing is suspended. The locking bushing 14 has an intermediate portion having a diameter D smaller than the diameter E of the bracket aperture 24 so that an annular clearance F is formed therebetween to allow for lateral movement of the bushing 14. The bushing 14 is clinched (for example as described in the aforementioned, incorporated patents) to an annular washer bearing 26 to allow the suspension of the main portion of the bushing 14 through the oversized aperture 24 so that the bearing washer 26 is supported and laterally slidable on the upper surface of 23 of the mounting bracket 22 to allow the bushing 14 movement or shifting as indicated by the shift arrows G in FIG. 3, relative to the mounting bracket 22. The lateral shift of the bushing 14 and bearing washer 26 permitted by the annular clearance F is designed to accommodate the potential for initial misalignment of the approaching coupling pin 12 and its axis C relative to the bushing bore 15 and its axis B for example under the potential condition when dimensional tolerances of the parts become cumulative or additive. The feature of the invention while important where two mounting pins are used is of greater significance and value where additional mounting pins are employed.

As shown in FIG. 3, the leading or pilot end 11 of the coupling pin 12 is chamfered or otherwise contoured so that the entering engagement against the correspondingly guiding contour of the bushing mouth 13 will promote displacement of any necessary laterally centering shift of the bushing 14 and its bore 15 into concentric alignment of the axes B and C to enable the continued progressive alignment and insertion of the pin 12 through the bushing 14 as shown in FIGS. 4–8. To ensure that the bushing 14 can only float or shift laterally, any longitudinal wobble in the shifting movement is prevented by dimensioning the bushing shoulder surface 17 for substantial engagement against the lower bracket surface 25 at least at the immediate periphery of the oversized bracket aperture 24.

Figure 4:
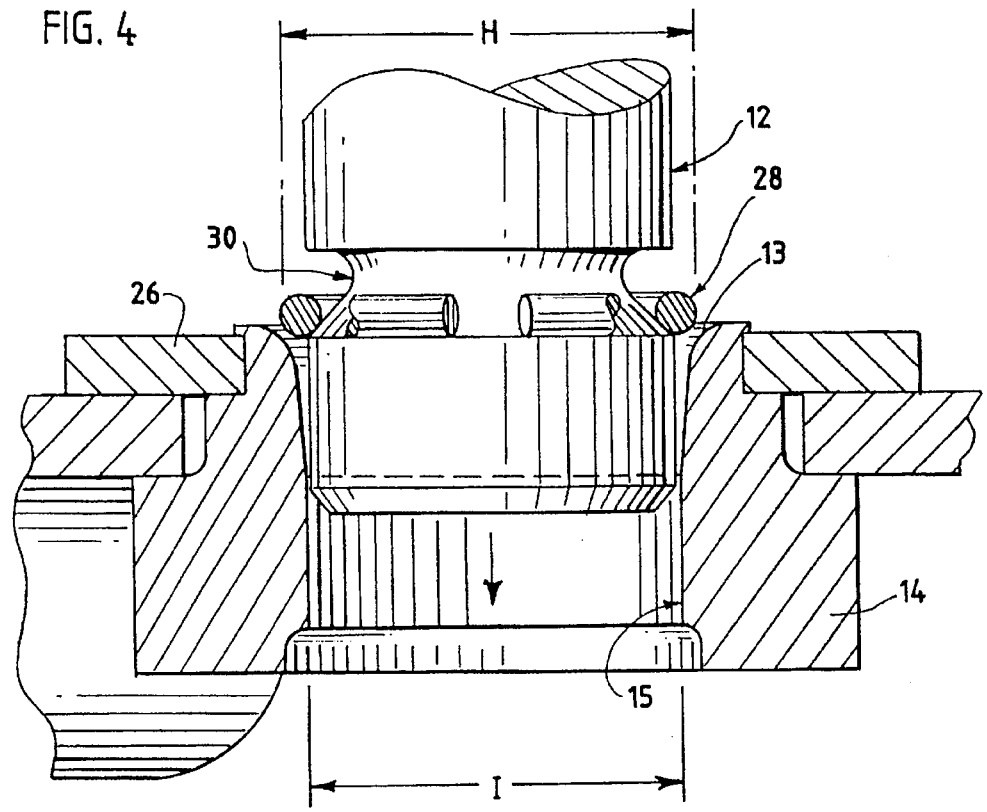
FIGS. 4–8 are sectional views similar to FIG. 3 illustrating sequential progression in coupling of the fastening assembly shown in FIGS. 1–3.
Figure 5:
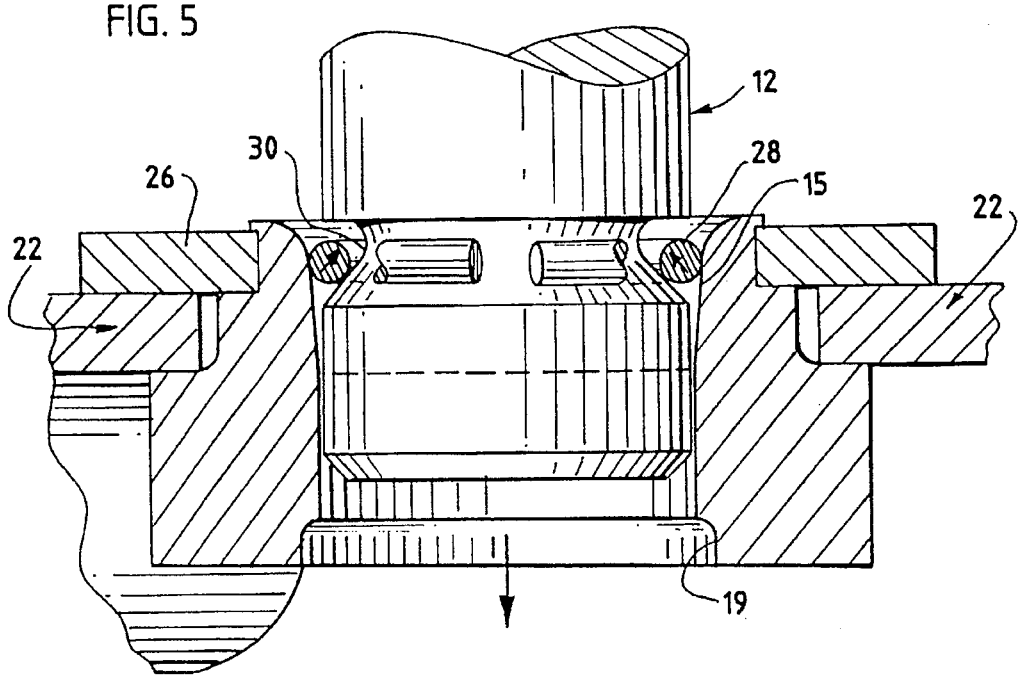
Figure 6:
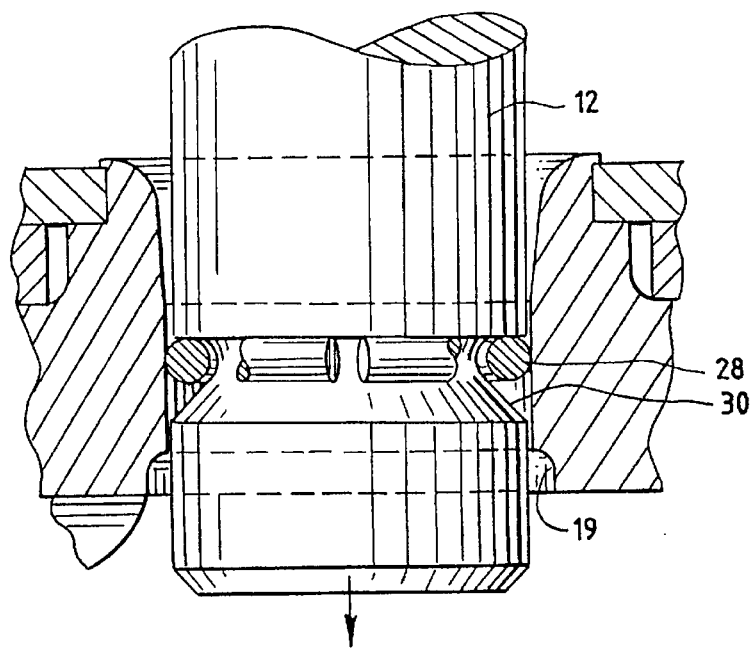
Figure 7:
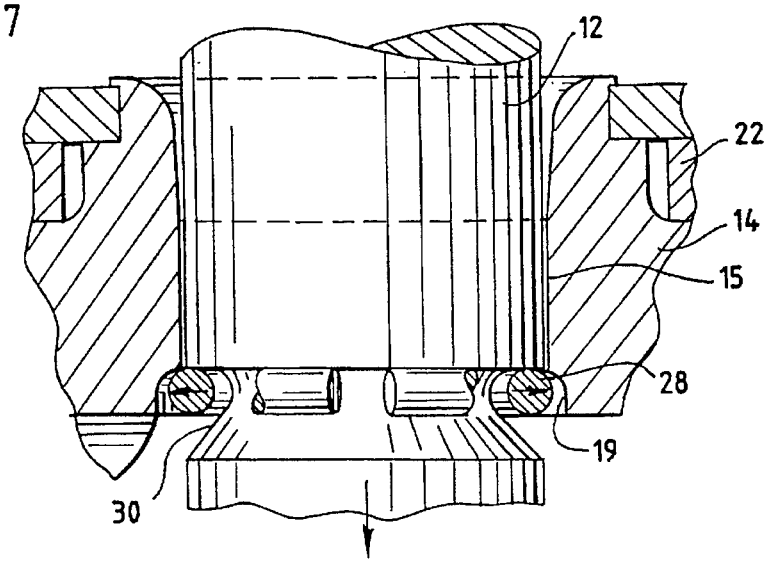

Referring now to FIG. 4, a resiliently compressible split ring 28 is carried on the pin 12 in a tapered annular groove 30 formed therein which guides the gradual compression of the ring against the bore wall. The shape of the groove 30, as will be discussed more fully hereinafter, is designed to facilitate the locking action of the split ring 28 by facilitating its initial compression and also to attain the final locking action in conjunction with the locking groove 19. The progress of the insertion of the coupling pin 12 into the bushing bore 15 brings the split ring 28 into engagement with the bushing mouth 13. The ring 28 has an unstressed outer diameter H which is larger than the internal bore diameter I of the bushing bore 15, resulting in radially inward compression of the ring 28 sliding against the bore wall diameter I as the pin 12 and ring 28 are forcibly pushed through the bushing 14 as shown in FIG. 5. As shown in FIG. 6, the compressed ring 28 is carried in the recessed groove 30 as the pin 12 proceeds to travel through the bore 15 until the ring 28 arrives at an annular locking groove 19 formed in the bushing 14 longitudinally leading from the smaller internal bore 15 as shown in FIGS. 7 and 8. Upon arrival at the locking groove 19, the compressed ring 28 reexpands into the larger diameter of the locking groove 19 in snap-action, and thereafter the contour and shoulder 19a of the locking groove 19 locks the expanded ring 28 therein preventing its recompression which prevents retraction of the pin 12 from the bushing 14 and securely fixes the module 1 onto the mounting brackets 22,22. As illustrated from FIG. 8, the locking ring 28 is captured by the shoulder 19a and any attempt to withdraw the pin 12 is resisted. Also the ring places a downwardly directed force on the tapered surface of groove 30 lending to bias the pin and the module is the direction indicated in resistance to the resilient mounting structure 6A of steering wheel assembly, as discussed hereinafter.

In the locked position of the module 1, the bottom module panel 5 is seated upon and slightly compresses four resilient or rubber-stops 6A on pillars 6 (two shown) provided in the wheel hub 3 (FIG. 1) so that the module 1 cannot be pushed further into the hub 3 and is upwardly biased and securely locked into the correctly mounted position.

Figure 9:
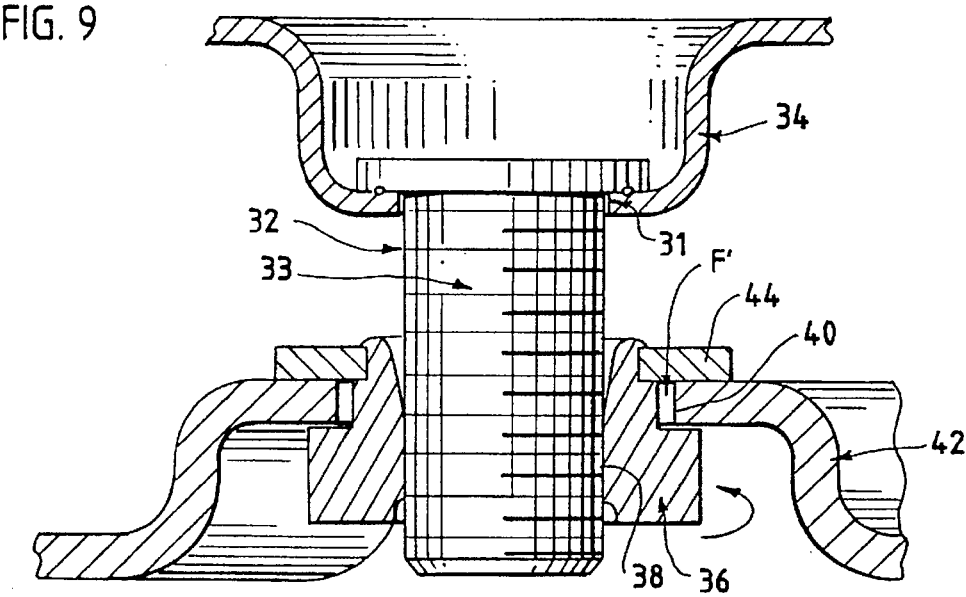
FIG. 9 is a fragmentary and sectional view of a second embodiment of a fastening assembly in accordance with the invention.

Referring now to FIG. 9, a second embodiment of the fastener assembly in accordance with the present invention is illustrated in which the threaded pin 32 which is staked at 31 or otherwise fastened on the underside of the inflatable module housing 34, has a threaded projecting portion 33. In this embodiment, a floating nut 36 is internally threaded at 38 and is rotationally mounted within the oversized aperture 40 of the bracket 42 to provide annular clearance F so that the internal threaded nut can be rotationally engaged onto the threaded portion 33 of pin 32 in order to fasten and secure the module housing 34 to the bracket 42 of the steering wheel hub (not shown) or other vehicle component. The nut 36 is clinched to a bearing washer 44 so that the nut 36 can laterally shift within clearance F of the bracket aperture 40 for accommodation any initial misalignment of the approaching pins 32, enabling proper thread alignment for threaded securement of the nut thereon, facilitated by peripheral, tool drive surfaces (not shown) on the nut.

Figure 10:
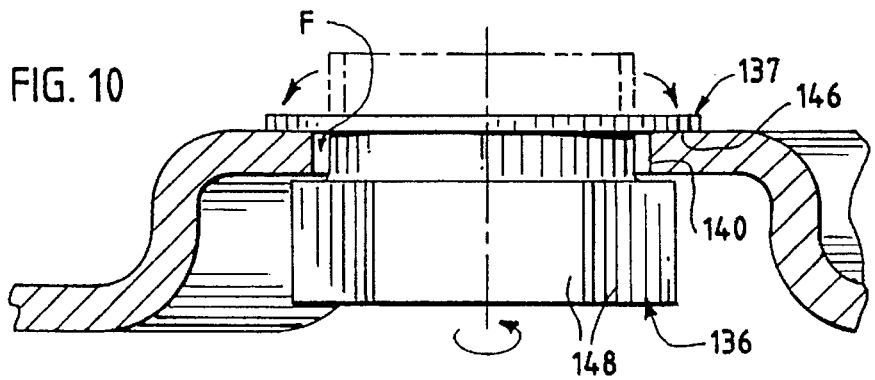
FIG. 10 is a sectional view of a nut and support bracket in a third embodiment of a fastening assembly in accordance with the present invention.

Turning to FIG. 10, a modified embodiment of an internally threaded nut 136 for use in a fastening assembly in accordance with the present invention is illustrated. In this embodiment, the nut 136 has an annular, out-turnable collar 137 which is rotationally supported on the upper peripheral surface 146 of the oversized bracket aperture 140 so that the floating nut 136 can be suspended therethrough with annular clearance F for shifting of lateral realignment as more fully described hereinabove with reference to the embodiment in FIG. 3. The nut 136 is initially formed with the collar 137 as shown in dotted outline. After the nut 136 is posted in aperture 140 the collar 137 is deformed or cold-worked to the position shown in full line. FIG. 10 also illustrates the circumferential, tool drive surfaces 148 for driven threading of the nut 136 onto a threaded fastener projecting from the air bag module (not shown) in accordance with the present invention.

Figure 11:
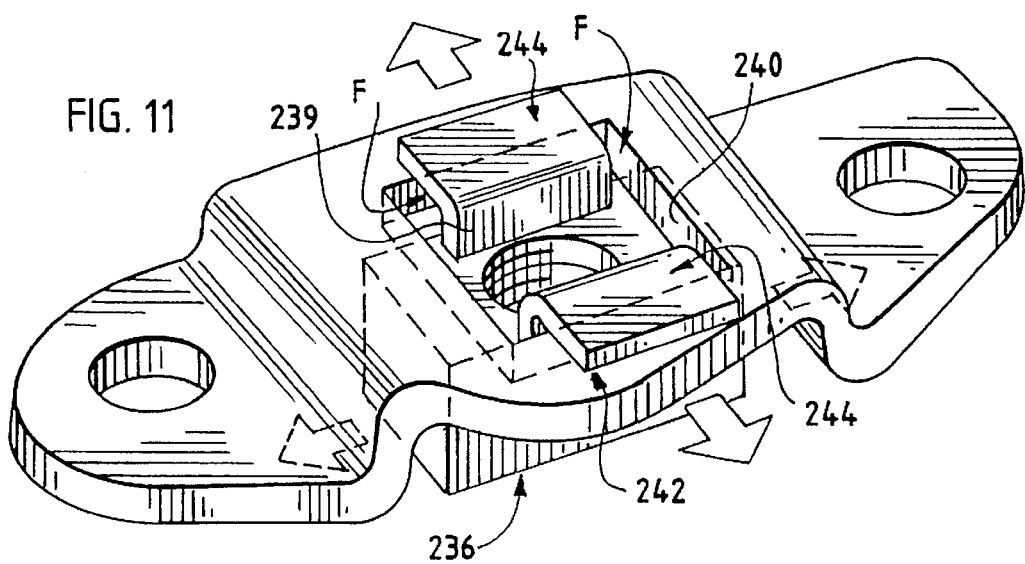
FIG. 11 is a perspective view of a nut and mounting bracket in a fourth embodiment of a fastening assembly in accordance with the invention.

Referring to FIG. 11, in a fourth embodiment of the fastening assembly in accordance with the present invention, a floating nut 236 can be made non-rotatable by providing rotational interference between the configuration of the bracket aperture 240 and the peripheral configuration of the nut surface 239 passing through the aperture 240, for example, respective rectangular configurations as shown in FIG. 11 while maintaining a clearance space F' circumferential to the nut periphery to enable shifting realignment of the nut 236 if the approaching threaded projection (not shown) is initially misaligned, as described hereinabove with respect to FIG. 3. In this embodiment, the nut 236 has support flange portions 244 which overlie the upper surface of the bracket 242 to support the floating suspension of the nut 236 through the bracket aperture 240. Also, it will be appreciated that with this arrangement, the mounting pin to be engaged with the nut must be rotatably mounted to attain threaded engagement, or a snap-fit, such as employed with the first embodiment may be utilized.

In summary, the present invention disclosures and envisions a mounting system wherein the air bag module can be quickly and securely mounted to the steering wheel or underlying support structure. Further, and problem of component misalignment occasional by cumulative error are manufacturing tolerances is accommodated. Further, the mounting system of the present invention, unlike the prior art, utilizes components of relatively conventional design and which can be fabricated using standard in place techniques and equipment.

While a preferred embodiment of the present invention is shown and described, it is envisioned that those skilled in the art may devise various modifications and equivalents without departing from the spirit and scope of the appended claims.

The invention claimed is:

1. A fastening assembly for mounting an inflatable module on a vehicle, comprising: a support structure arranged for securing the inflatable module to a vehicle component; a coupling member disposed on said support structure; a locking member securable to said vehicle component and arranged to enable a coupling between said locking member and said coupling member to secure fastening of said module to said vehicle component; an internally threaded nut structure secured to said support structure through which a threaded bolt portion of said coupling member is threadably engaged to provide threadable adjustment therebetween for enabling tightening of said coupling of said locking member and coupling member, in order to prevent any relative movement in said coupling and to allow uncoupling thereof for disassembly of said module, said coupling member further comprising a projecting portion formed on an axially opposing end of said coupling member relative to said bolt portion, said projecting portion arranged for fit into a locking position within said locking member to define said coupling of said locking and coupling member, said locking member comprising a bore receiving said projecting portion of said coupling member; a tool engagement formation located on an end of said projecting portion passing into said bore and projecting therefrom in said locking position; and a lock element comprising a resiliently compressible split-ring carried on said projecting portion and expandably inserted into a locking formation within said bore.

2. A fastening assembly according to claim 1, wherein said bore is arranged to enable access of a tool therethrough during tightening of said coupling or said uncoupling and disassembly of said module.

3. A fastening assembly for mounting an inflatable module on a vehicle, comprising:
   a support structure arranged for securing the inflatable module to a vehicle component, said support structure having a threaded structure;
   a coupling member having a threaded portion engaged with said threaded structure, said coupling member further having a projecting portion extending from said threaded portion thereof;
   locking structure securable to said vehicle component, and arranged for engagement by said coupling member to secure said module to said vehicle component, said locking structure comprising a locking aperture for reception of said coupling member;
   a locking component carried by said projecting portion of said coupling member, said locking component and said projecting portion being insertable together into said locking aperture formed in said locking structure to attain locking insertion and connection such that said locking component engages said locking structure to secure said module to said vehicle component; and
   said engagement of said threaded structure and the threaded portion of said coupling member being threadably adjustable to enable tightening of said coupling thereto and to allow uncoupling of said module from said vehicle component for disassembly of said module.

4. A fastening assembly according to claim 3, wherein said locking member comprises a bore receiving said projecting portion of said coupling member, said projecting portion having a tool-engagement formation located on an end of said projecting portion passing into said bore in order to allow engagement of a tool thereagainst by which said tightening of said coupling or said uncoupling can be driven.

5. A fastening assembly according to claim 3, wherein said locking insertion attains a snap-fit engagement of said locking component with said locking aperture.

6. An assembly for mounting an inflatable air bag module on a vehicle component such as a steering wheel, said assembly comprising:
   a support structure for the inflatable module, which support structure is adapted to be secured to said vehicle component;
   at least a pair of coupling members projecting from said support structure, said coupling members being secured to said support structure by an adjustable, threaded connection and having tool engaging surfaces formed on a distal end of each said coupling member opposite said threaded connection;
   locking components carried by said respective coupling members engaged with said support structure and said locking components being insertable with the coupling members into respective locking apertures provided on said vehicle component, said locking components and said locking apertures arranged to produce locking reception during insertion of said respective coupling members to attain and maintain assembly of said support structure with said vehicle component;

the threaded adjustability of said connection between said coupling members and the support structure permitting the adjustment of the degree of engagement of said air bag module with said vehicle component.

7. An assembly according to claim 6, wherein said threaded connection comprises a nut structure secured to said support structure and said coupling member comprises a threaded portion threadable into said nut structure to provide said threaded adjustability.

8. A fastening assembly according to claim 6, wherein said insertion attains a snap-fit engagement of said locking component with said locking aperture.

9. A fastening assembly for mounting an inflatable module on a vehicle comprising: a support structure arranged for securing the inflatable module to a vehicle component; a coupling member having a portion projecting from said support structure; a locking member securable to said vehicle component, and arranged for reception of said coupling member; and a lock element separately formed and movably linked to and carried on said projecting portion of said coupling member in arrangement enabling insertion of said lock element with said projecting portion into said locking member for fit into a locking position within said locking member to secure fastening of said module to said vehicle component, wherein said lock element comprises a resiliently compressible split-ring, expandably inserted into a cavity formed in said locking member to define said locking position, said split-ring being movably carried within an annular recess formed in said projecting portion of the coupling member.

* * * * *